United States Patent [19]

Arner

[11] 4,034,715

[45] July 12, 1977

[54] CONVERTIBLE PET FEEDER AND METHOD

[75] Inventor: Robert Arner, North Canton, Ohio

[73] Assignee: Ralston Purina Company, St. Louis, Mo.

[21] Appl. No.: 664,124

[22] Filed: Mar. 5, 1976

[51] Int. Cl.² .......................................... A01K 5/00
[52] U.S. Cl. ............................ 119/51.5; 119/52 R; 119/77
[58] Field of Search ................... 119/51.5, 52 R, 53, 119/72, 77

[56] References Cited

U.S. PATENT DOCUMENTS

| 905,278 | 12/1908 | Benefiel | 119/51.5 |
|---|---|---|---|
| 1,023,352 | 4/1912 | Anderson et al. | 119/51.5 |
| 1,922,612 | 8/1933 | Barker | 119/77 |
| 3,720,184 | 3/1973 | Pearce | 119/51.5 |
| 3,730,141 | 5/1973 | Manning | 119/51.5 |
| 3,763,826 | 10/1973 | Portelli | 119/52 R |

Primary Examiner—J.N. Eskovitz
Attorney, Agent, or Firm—Veo Peoples, Jr.

[57] ABSTRACT

A pet feeder which readily converts from a solid feeder to a liquid feeder. The feeder has only two physically distinct members; i.e., a feeding tray and a container which is adaptable to holding and delivering to the feeding tray either flowable solid or liquid material.

9 Claims, 8 Drawing Figures

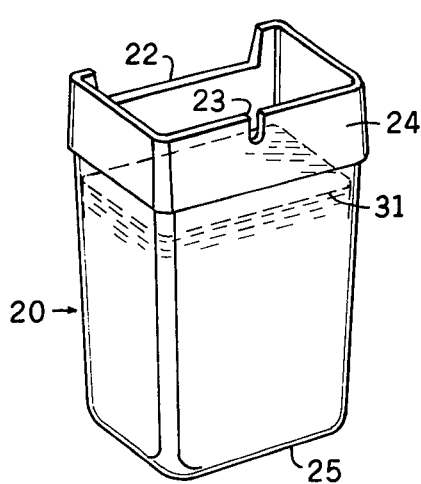
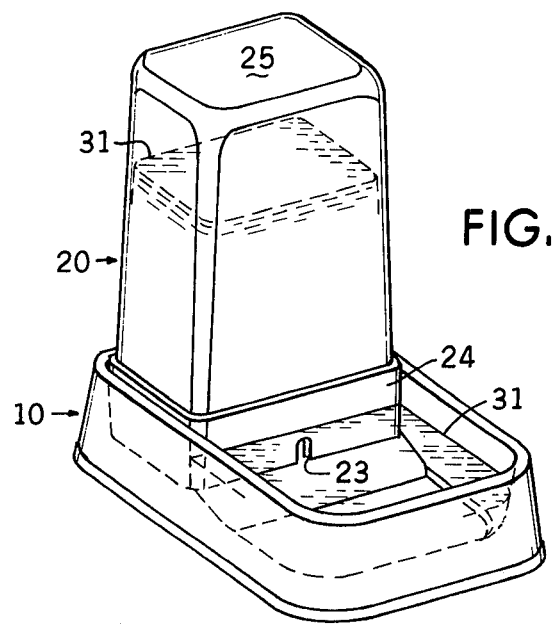
FIG. 5  FIG. 6
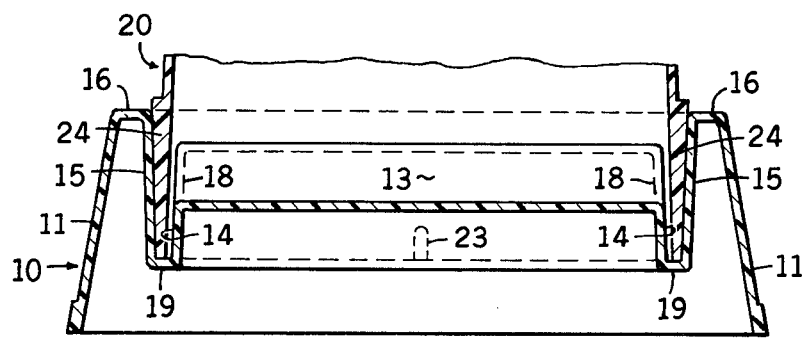
FIG. 7
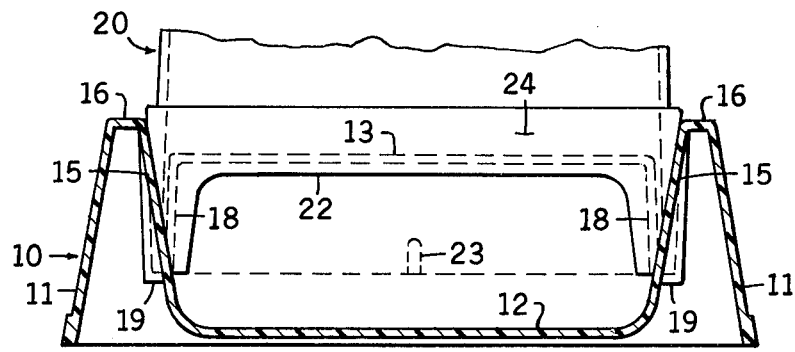
FIG. 8

CONVERTIBLE PET FEEDER AND METHOD

SUMMARY OF THE INVENTION

The present invention is an improved pet feeder which can be converted from liquid use to solid use by merely manipulating the position of engagement of its elements. The feeder comprises two elements, a feeding tray and a container element. The feeding tray has a ramp which defines a recessed groove for releasably engaging the container. The container has one open end. The open end has defined therein a mouth and a spout in spaced apart relation.

BRIEF DESCRIPTION OF THE DRAWINGS

Further objects and additional advantages of the invention will become apparent from the following description and annexed drawings wherein:

FIG. 5 is an additional perspective of the container in the filling position but filled with liquid.

FIG. 6 is a perspective of the feeder, filled with liquid material in the feeding position.

FIG. 7 is a sectional view taken along 7—7 of FIG. 2.

FIG. 8 is a sectional view taken along the line 8—8 of FIG. 2.

DESCRIPTION OF THE PREFERRED EMBODIMENTS

Figure 1:
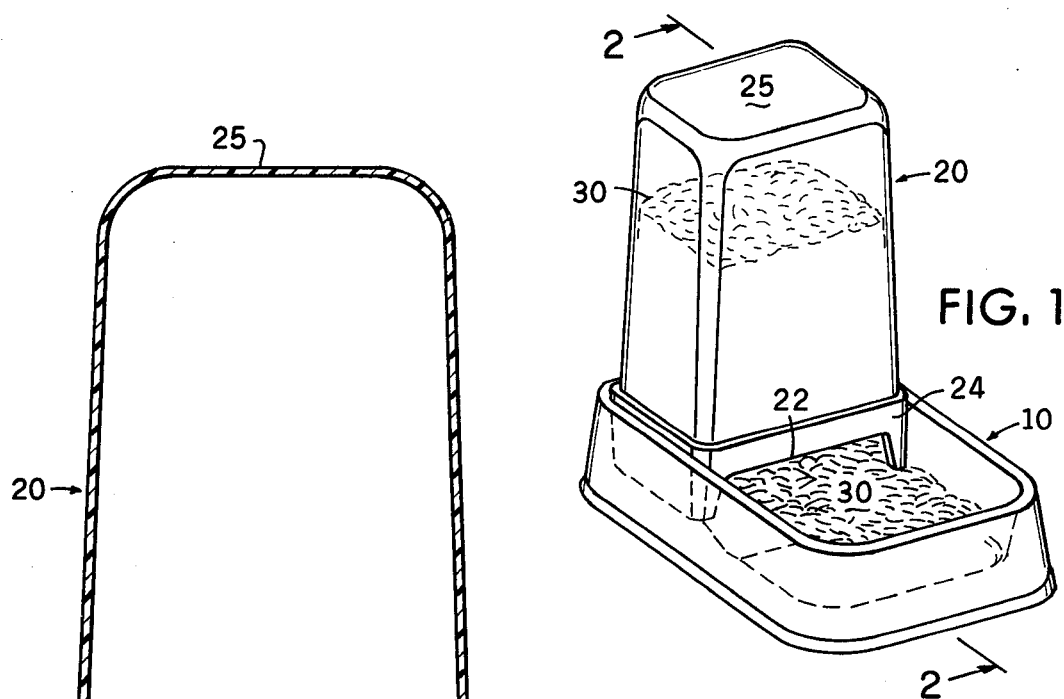
FIG. 1 is a perspective view of the feeder, filled with solid material in the feeding position.
Figure 2:
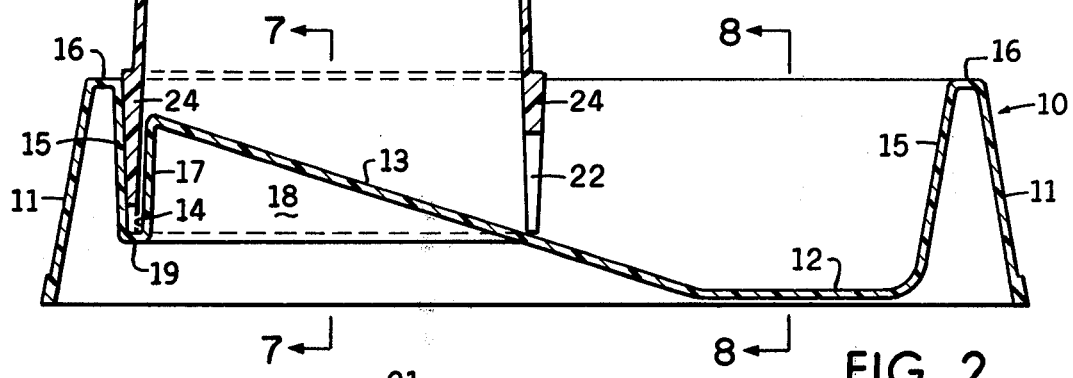
FIG. 2 is a sectional view taken along the line 2—2 of FIG. 1.
Figure 4:
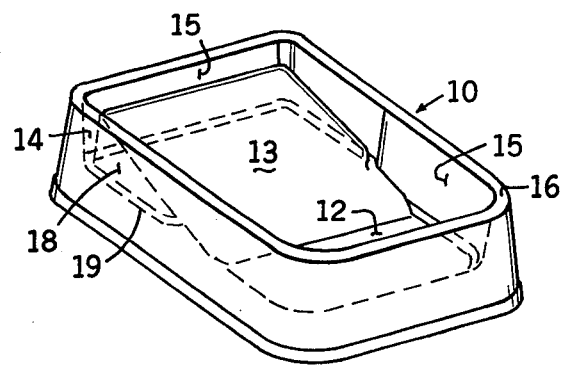
FIG. 4 is a perspective view of the feeding tray.

Referring to the drawings FIG. 1 shows, and particularly to FIGS. 2, 4 and 8, numeral 10 designates the feeding tray of the device. The tray may be of any convenient shape such as round, oval, square, rectangular, etc., however, in the preferred form of the invention the tray is rectangular in shape. Preferably, it is formed of thin molded plastic material. The forward end of the floor of the tray, designated at 12, is preferably a flat surface for receiving the flowable material, 30 or 31. The walls of the tray shown generally at 11 are preferably double walls having an inner wall 15 connected by a flat connecting portion 16.

The rearward floor of the tray is in the form of a ramp 13, the rear 17 and side 18 walls of the ramp are in spaced relationship to the inner walls 15 of the tray and preferably connected thereto by the flat ledge 19 so as to define a recessed groove 14 for receiving into releasable engagement the open end 21 of a container 20. Note that the peripheral shape of the ramp 13 and thus the contour of the groove may be adapted to any shape desired provided that the open end of the container is likewise fabricated to releasably engage therein. Although the preferred embodiment of this invention has a ramp 13 with 3 distinct walls and the rear wall 17 thereof being somewhat wider than the associated side walls 18, the walls of the ramp could be of the same width, or the ramp could have a circular or rounded periphery and still be within the contemplated scope of this invention. Also the ramp 13 may extend over the entire bottom wall of the tray 10.

The open ended container member 20 may be of any convenient size or shape which will accommodate either solid or liquid flowable feed material. As previously mentioned, the open end 21 of this container is fabricated to releasably engage the groove 14 in the feeding tray 10. It is a preferred embodiment of the present invention that the open end 21 comprise a margin of thin walled plastic with its outer surface 24 defining a wedge angling outward toward the closed end 25 of the container. Thus the open end will snuggly engage into the groove 14 of the tray while also being releasable by a pulling action.

Figure 3:
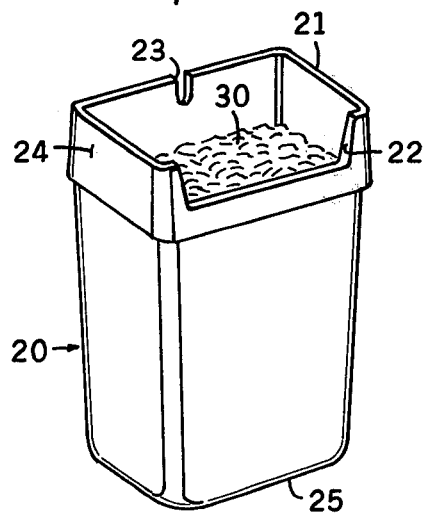
FIG. 3 is a perspective view of the container in the filling position and filled with flowable solid material.

The open end 21 of the container will also have along its periphery a margin with two spaced apart recesses called a spout 23 and a mouth 22. The spout 23 and mouth 22 are hideably displaced from one another. That is, they are located so that when the mouth 22 is disposed along the ramp as an escape for the contents of the container, the spout will not be disposed but rather will be hidden along the wall of the ramp within the groove (See FIG. 2 and FIGS. 7 and 8). It is a preferred embodiment of the present invention that the spout be located on the side opposite to the mouth (FIGS. 3 and 5) since the open end is a rectangular shape (same would be true of an oval shape). However, please note that if a square shape is desired the mouth and spout could be located on adjacent sides, or if a circular open end is desired the spout and mouth could be located somewhat closer to one another.

The purpose of the mouth is to allow solid 30 flowable material (See FIG. 1) to flow out of the container 20 down the ramp 13 and onto the flat surface 12 of the feeding tray 10. It is preferred that the material flow out of the container as fast as possible, and as much as possible. The only limitation is that the material not overflow the walls 11, 15 and 16 of the tray. Thus the mouth may be as wide as the width of the container will allow but no higher than the distance between the surface of the ramp and the top of the tray wall.

The purpose of spout is to permit flowable liquid 31 material (See FIG. 6) to flow out of the container down the ramp and onto the flat service of the feeding tray. Since flowable liquid material can be lost by splattering, the spout must restrict flow moreso than the mouth. Therefore, the spout is designed to be not so small that water escapes too slowly yet not so large that substantial amounts are lost. It must permit a reasonable flow rate and it must be located beneath the top of the tray wall so that the material does not overflow.

The method of filling and assembling the convertible pet feeder of this invention is quite unique. It is this aspect of the invention which permits this simple feeder to function so effectively. First the container is held in the filling position with its open end up (See FIG. 3 for solid material and FIG. 5 for liquid material). Then the feeder is filled with either liquid or solid flowable material. Then, the feeding tray is lifted and engaged onto the container as the dotted arrow between FIGS. 3 and 4 indicates. Finally, the entire feeder is flipped or reversed over into the feeding position (FIGS. 1 and 6). Note that if the container contains liquid material, the spout should be disposed down the ramp, but if solid material is in the container then the mouth is disposed down the ramp. Therefore, the same container is used alternatively for solid or liquid yet the container is adapted to the peculiarities of either material.

The foregoing disclosure is representative of a preferred form of the invention. It is to be interpreted in an illustrative rather than a limiting sense.

I claim:

1. A convertible pet feeder for feeding flowable solid or liquid materials, said feeder comprising:
   a. a feeding tray having an inner wall about the tray and also having a floor, a portion of which is flat and is directly adjoining the base of at least a portion of the inner wall, the remaining portion of the floor being a ramp also having walls which define a groove between themselves and the remaining portion of the inner wall of the tray;
   b. said feeder further comprising an open-ended container having a margin defining its open end, said margin having spaced apart recesses defining a mouth for solid materials and a spout for liquid materials, the open end being removably engaged in the groove of the tray with one of said spaced apart recesses being disposed over the ramp and the other recess being indisposed in the groove;
whereby selectively either solid or liquid material may flow out of the container, over the ramp and onto the floor of the tray.

2. The pet feeder of claim 1 wherein the feeding tray ramp and the open end of the container are rectangular.

3. The pet feeder of claim 2 wherein the mouth and spout are on opposite sides.

4. The pet feeder of claim 1 wherein the feeding tray ramp and the open end on the container are square.

5. The pet feeder of claim 4 wherein the mouth and spout are on adjacent sides.

6. The pet feeder of claim 1 wherein the feeding tray ramp and the open end of the container are oval shaped.

7. The pet feeder of claim 1 wherein the feeding tray ramp and open end of the container are circular.

8. The feeder of claim 1 wherein the open end of the container comprises a margin of thin walled plastic with an outer surface and an inner surface, said surfaces defining a wedge angling outward the closed end of the container; whereby the open end of the container will snuggly engage into the groove on the feeding tray and yet remain releasable by a pulling action.

9. The pet feeder of claim 1 wherein the portion of the floor directly adjoining the inner wall is a continuation of the ramp.

* * * * *

UNITED STATES PATENT AND TRADEMARK OFFICE
CERTIFICATE OF CORRECTION

PATENT NO. : 4,034,715
DATED : July 12, 1977
INVENTOR(S) : Robert Arner

It is certified that error appears in the above-identified patent and that said Letters Patent are hereby corrected as shown below:

| | | |
|---|---|---|
| Column 1, | line 6 | "hich" should read "which" |
| " " | line 7 | "erely" should read "merely" |
| " " | line 8 | "lements." should read "elements." |
| " " | line 9 | "ng" should read "ing" |
| " " | line 11 | "ngaging" should read "engaging" |
| " " | line 12 | "nd." should read "end". |
| " " | line 13 | "pout" should read "spout" |
| " " | line 17 | "vention" should read "invention" |
| " " | line 18 | "escription" should read "description" |
| " " | line 20 | "olid" should read "solid" |
| " " | line 22 | "IG. 1" should read "FIG. 1" |
| " " | line 24 | "illing" should read "filling" |
| " " | line 27 | "he" should read "the" |
| " " | line 29 | "aterial" should read "material" |
| " " | line 32 | "IG. 2" should read "FIG. 2" |
| " " | line 37 | "arly" should read "larly" |
| " " | line 38 | "eeding" should read "feeding" |
| " " | line 39 | "onvenient" should read "convenient" |
| " " | line 40 | "ular" should read "gular" |
| " " | line 41 | "ion" should read "tion" |
| " " | line 42 | "ormed" should read "formed" |
| " " | line 43 | "nd" should read "end" |
| " " | line 44 | "bly" should read "ably" |
| " " | line 45 | "0 or 31." should read "30 or 31" |
| " " | line 46 | "re" should read "are" |
| " " | line 47 | "onnected" should read "connected" |
| " " | line 49 | "3, the rear" should read "13, the rear" |
| " " | line 50 | "paced" should read "spaced" |
| " " | line 51 | "referably" should read "preferably" |

UNITED STATES PATENT AND TRADEMARK OFFICE
CERTIFICATE OF CORRECTION

PATENT NO. : 4,034,715
DATED : July 12, 1977
INVENTOR(S) : Robert Arner

It is certified that error appears in the above-identified patent and that said Letters Patent are hereby corrected as shown below:

| | | |
|---|---|---|
| Column 1, | line 52 | "o define" should read "to define" |
| " " | line 53 | "ble" should read "able" |
| " " | line 54 | "ote" should read "Note" |
| " " | line 55 | "he" should read "the" |
| " " | line 56 | "esired" should read "desired" |
| " " | line 57 | "kewise" should read "likewise" |
| " " | line 58 | "hough" should read "though" |
| " " | line 60 | "hereof" should read "thereof" |
| " " | line 61 | "alls 18," should read "walls 18," |
| " " | line 62 | "idth" should read "width" |
| " " | line 63 | "eriphery" should read "periphery" |
| " " | line 64 | "his" should read "this" |
| " " | line 65 | "ntire" should read "entire" |
| " " | line 67 | "onvenient" should read "convenient" |
| " " | line 68 | "her" should read "ther" |

Signed and Sealed this

Third Day of January 1978

[SEAL]

Attest:

RUTH C. MASON
Attesting Officer

LUTRELLE F. PARKER
Acting Commissioner of Patents and Trademarks